Oct. 14, 1941.   R. WEST   2,259,411
MINE CAR BRAKE
Filed June 20, 1940   2 Sheets-Sheet 1
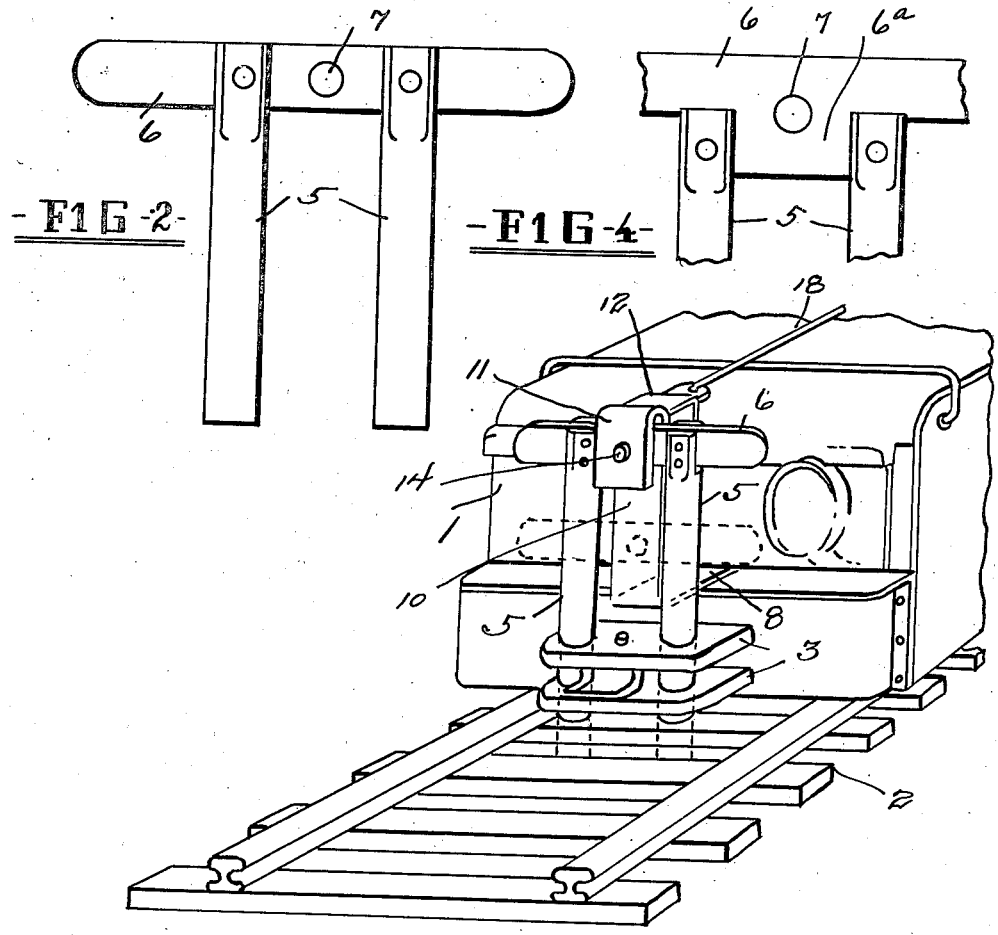
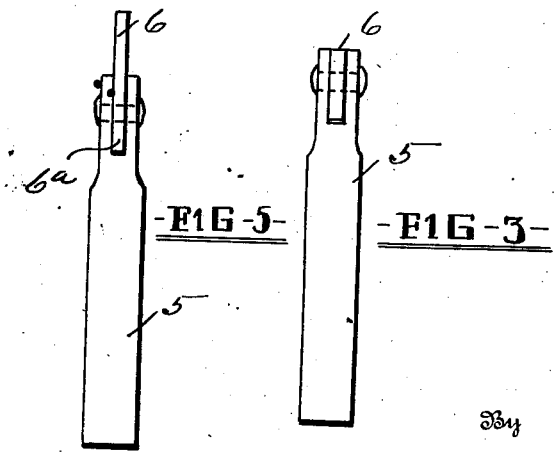
Inventor
RUBEN WEST,
By
Attorney

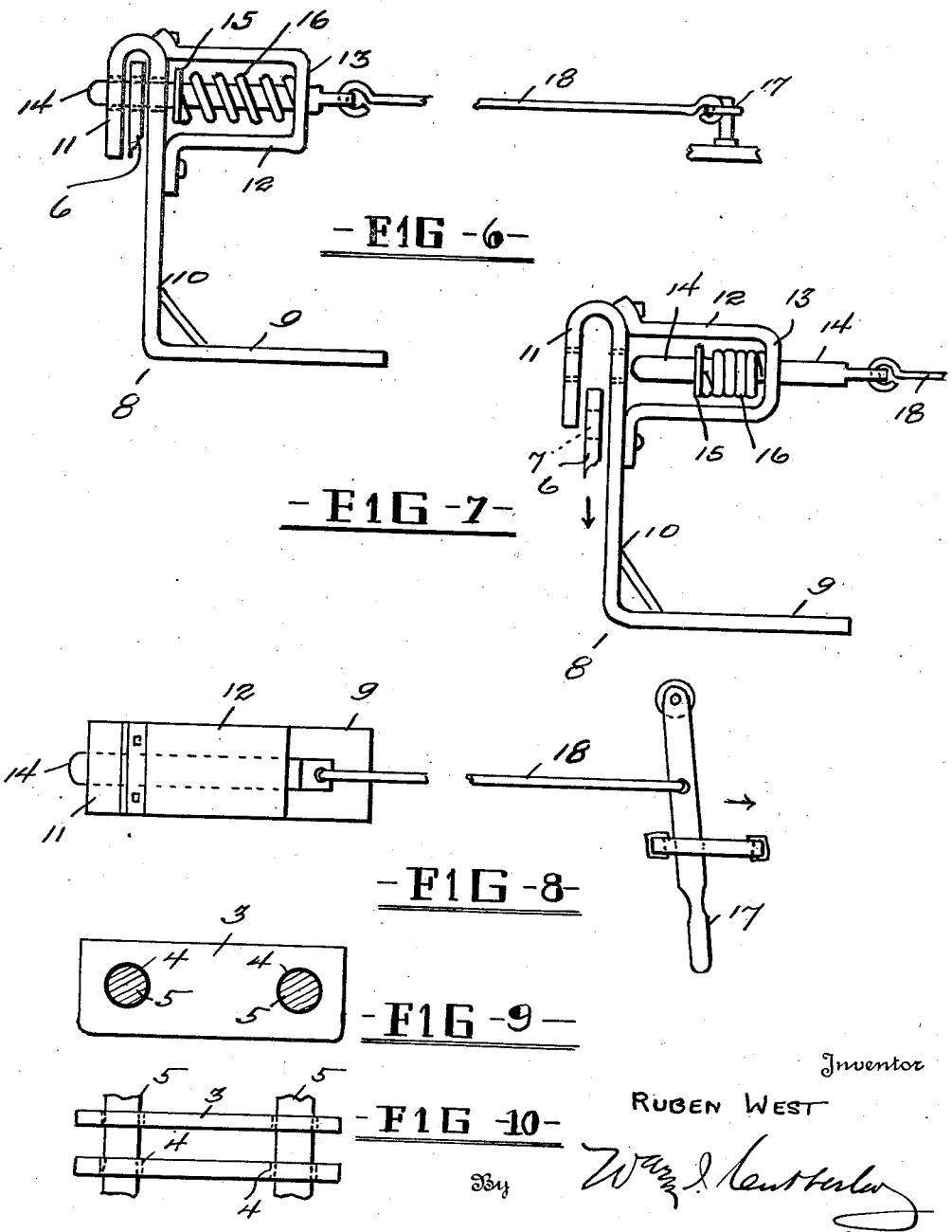

Patented Oct. 14, 1941

2,259,411

UNITED STATES PATENT OFFICE 2,259,411

MINE CAR BRAKE

Ruben West, Bakerton, Pa.

Application June 20, 1940, Serial No. 341,565

5 Claims. (Cl. 188—38)

My present invention, in its broad aspect, has to do with improvements in drags or brakes for use especially with electric mine motors whereby the same is positively stopped in the event of parting of a hauling cable, connecting link, or other instrumentality which would cause the same to move down hill or down grade especially where the grade is steep. My invention, however, is not to be construed as limited to this particular use, since it may be used with equal facility on any rolling stock, car, or the like, and is positive and certain in its action.

Other and equally important objects and advantages of my invention may be briefly defined as follows: (1), the action of my drag or brake is positive since it engages the road bed or ties of the track on which the car, mine motor, or the like is operating, and thereby anchors the same against further movement; (2), my drag is easily installed and is relatively inexpensive, and may be applied to cars, mine motors and the like now in use, and there are no parts likely to become out of order, and there is no chance of "slippage" or the like; (3), my device is designed to become effective before any momentum is built up, and is a safety device which may be depended upon to stop the car, motor or the like, immediately and positively, and (4), there are no fragile, intricate or complicated parts, nor can failure of some supplementary mechanical medium render my device inoperative.

Other and equally important objects and advantages will be apparent as the description of my invention proceeds, but it is to be understood that changes in size, shape, arrangement and combination of parts is permissible to adapt my device to various conditions of practice provided such changes fall within the purview of my broad inventive concept and the claims appended hereto.

In the drawings wherein the preferred form of my invention is illustrated:

Figure 1 is a perspective view of my device as applied to an electric mine motor, and shows its method of operation;

Figure 2 is a detailed view of the anchoring members of my drag;

Figure 3 is an edge or side view of my anchoring member;

Figure 4 is a view of a modified form of my anchoring member;

Figure 5 is an edge or side view of the modified form of my anchoring member;

Figure 6 is a detailed side view of the releasing and catch mechanism for my drag;

Figure 7 is a detailed view of the releasing or catch mechanism in its position to release the anchoring device;

Figure 8 is a detailed top view of the releasing or catch mechanism of my anchoring device;

Figure 9 is a detailed section of the guard or keeper of the anchoring member;

Figure 10 is a view of the guard or keeper partly fragmentary.

In the drawings wherein like characters of reference are used to designate like or similar parts throughout the several views:

The numeral 1 designates a conventional type of electric mine motor, but in this connection I wish it to be specifically understood that my invention is not to be considered as limited in use to electric mine cars. The tracks and ties and road bed are designated by 2, and my invention is especially useful where the grade is steep.

Attached in any suitable manner to the motor 1 are a pair of spaced, parallel guards or keepers 3 provided with spaced relatively and vertically aligned openings 4 through which extend the anchor bars 5 of my anchoring member. The anchor bars are vertical, spaced and relatively parallel and are designed to engage the ties, or roadbed 2 when in action.

The anchor bars 5 have bifurcated top ends in which is seated and attached by bolts, rivets, or otherwise, a transverse connecting bar 6 formed with a center opening 7. As shown in Figures 4 and 5, the connecting bar 6 may be formed with a depending web member 6a to which the anchor bars 5 are attached instead of being attached directly to the body of the connecting bar as in Figures 2 and 3. The connecting bar and the two anchor bars together form my anchoring member which is designed to move up and down in the guards or keepers 3 into and out of engagement with the ties or road bed 2.

Attached to the mine motor 1 is a support 8 having a horizontal base member 9 and a vertical part 10 on the upper end of which is formed a substantially U-shaped (inverted) bracket 11. The bracket 11 is formed by bending the end of the vertical part 10 forward and downward as shown in Figures 1, 6 and 7 to provide a space in which the connecting bar 6 is positioned when in its passive status and out of engagement with the ties or road bed. Suitably attached to the vertical part 10 of the support is a substantially U-shaped housing member 12 having a base 13 formed with an opening horizontally aligned with openings formed through the elements of the bracket member 11 to receive a locking pin 14 provided with a flange 15 and about which is a compression spring 16 abutting the base 13 of the housing and the flange 15 to normally urge the pin 14 forward through the openings in the bracket.

When the anchoring member is in its passive position as shown in Figures 1 and 6, the opening 7 registers with the openings in the bracket and the pin 14 extends therethrough to hold the anchoring member in such position and out of engagement with the ties or road bed.

To release the anchoring member, I provide a hand lever 17 on the mine motor connected with a cable 18 which in turn is connected with the locking pin 14 so that movement of the hand lever in the direction of the arrow in Figure 8 will draw the pin against the spring 16 to release the anchoring member when it will drop of its own weight to a position with its ends engaging the ties or road bed to provide a positive anchor for the mine motor. While I have shown a form of hand lever, and a specific form of locking and releasing device, changes may be made in these features to conform to dictates of practice. It will be understood that the construction of the anchor bars, keepers, and the like is substantial—that is sufficiently strong to hold the mine motor or any strains and stresses to which they may be put in action.

In operation, the hand lever is simply pulled to release the locking pin from the connecting bar 6 in the event it is desired to operate my anchoring device in which case the anchoring device drops into anchoring position automatically, and its effect is positive, certain, and immediate.

While I have shown and described a specific form and arrangement of my invention, it is to be understood that changes in construction may be made provided such changes fall within the scope of my inventive concept, and a broad interpretation of my claims.

I claim:

1. A brake or drag comprising an anchoring member formed with a pair of spaced, vertical anchor bars designed to engage a base when in action a connecting member for said anchor bars; a keeper assembly for such anchoring device, a bracket into which said connecting member fits when the anchor bars are inactive, and a locking and release member to hold said anchoring member in inoperative position including a locking pin operating through said bracket, a spring pressing said pin into locking engagement with the connecting member of said anchor bars of said anchoring device, and means for releasing the pin, said anchoring device in its entirety moving to its active position when released by its own weight.

2. A brake or drag for moving vehicles comprising an anchoring member formed with spaced, vertically movable anchor bars, and a connecting bar arranged horizontally and attached to said anchor bars, a latching and releasing device for said anchoring member, having a movable pin to engage the connecting bar of said anchoring member to hold it in its passive position, and spring means for holding said pin in its active position, and means for releasing said pin.

3. A positive brake or drag for moving vehicles having an anchoring device adapted to engage the medium over which said vehicle is moving to anchor said vehicle in a fixed position, said anchoring device comprising vertically movable anchor bars, a keeper for said bars, means for connecting said bars together to operate as a unit, said bars arranged to move downwardly in anchoring position of their own weight, a support, a bracket into which said connecting means for the anchor bars fits when said bars are passive, a latching and releasing device for the anchoring device carried by the support, a movable, spring pressed pin carried by the latching and releasing device and operating through the bracket to engage the connecting member when the anchor bars are in passive position, and means for releasing the pin.

4. A mine motor drag or brake, comprising a pair of spaced, substantially parallel and vertical anchor bars connected together at their upper ends to operate as a unit, a keeper for said anchor bars, and a latching and releasing mechanism including a spring pressed latching pin, a housing therefore, and means for releasing said pin from engagement with the connecting means of the anchor bar unit to permit said unit to move of its own weight into operative position.

5. A mine car or motor drag or brake, comprising a pair of relatively spaced apart, vertically arranged and substantially parallel anchor bars designed to exert their anchoring effect simultaneously on each side of tht longitudinal axis through the car or motor and connected together to operate as an anchoring unit, a keeper for said anchor bars, and a latching and releasing mechanism including a spring pressed latching pin, a housing therefore, and means for releasing said pin from engagement with the anchor bar unit to permit said unit to move of its own weight into operative position.

RUBEN WEST.